United States Patent [19]

Belanger

[11] Patent Number: 4,607,965

[45] Date of Patent: Aug. 26, 1986

[54] COMPOSITE BEARING WITH METAL HOUSING HAVING A BORE, WITH A TUBULAR PLASTIC INSERT THEREIN

[75] Inventor: James A. Belanger, Northville, Mich.

[73] Assignee: Belanger, Inc., Northville, Mich.

[21] Appl. No.: 709,956

[22] Filed: Mar. 8, 1985

[51] Int. Cl.[4] ........................ F16C 33/20; F16C 33/04

[52] U.S. Cl. .................................... 384/299; 384/276; 384/295

[58] Field of Search ............... 384/226, 227, 228, 275, 384/276, 295, 290, 297-300, 416, 428

[56] References Cited

U.S. PATENT DOCUMENTS

| | | | |
|---|---|---|---|
| 1,581,854 | 4/1926 | May . | |
| 2,683,637 | 7/1954 | Skillman, Jr. et al. | 384/299 |
| 2,895,728 | 7/1959 | Edelman . | |
| 3,010,733 | 11/1961 | Melton | 384/297 X |
| 3,499,183 | 3/1970 | Parsons | 384/276 X |
| 4,134,175 | 1/1979 | Contoyanis | 384/296 X |
| 4,393,293 | 7/1983 | Inoue et al. | 384/276 X |
| 4,427,049 | 12/1980 | Belanger et al. | 160/199 |
| 4,432,406 | 2/1984 | Belanger et al. | 160/199 |

FOREIGN PATENT DOCUMENTS

| | | | |
|---|---|---|---|
| 1354182 | 1/1964 | France | 384/276 |

OTHER PUBLICATIONS

"GAR-DUR R Plastic Gains Wide Acceptance in Hydro-electric Industry", (two sides), Garland Mfg. Co. P.O. Box 71, Saco, ME/USA 04072, Electrical World, Jul. 1981.

"GAR-DUR R Plastic Wheels Keep Fords Rolling", (two sides), Garland Mfg. Co., P.O. Box 71, Saco, ME/USA 04072, Automotive News, Jan. 25, 1982, more info bulletin #179.

"GAR-DUR R Plastic Conveys Improved Cost Performance on Automotive Assembly Lines", (one side), Garland Mfg. Company, P.O. Box 71, Saco, ME/USA 04072, more info bulletin #982, date unknown.

Packing instructions entitled "SEALMASTER Ball Bearings", (two sides), SealMaster Bearings Morse Chain Division, Borg-Warner Corporation, Aurora, Illinois 60507, date unknown.

*Primary Examiner*—Stuart S. Levy

*Assistant Examiner*—Thomas R. Hannon

*Attorney, Agent, or Firm*—Cullen, Sloman, Cantor, Grauer, Scott & Rutherford

[57] ABSTRACT

An improved bearing for supporting a bi-fold door member. The bearing is formed from a block of high molecular weight polymer material having a bore extending from its top surface to its bottom surface. The bore is configured to tightly receive a shaft. The bearing supports the door and is rotatably slidable with respect to the shaft as the door member is opened and closed.

14 Claims, 8 Drawing Figures

COMPOSITE BEARING WITH METAL HOUSING HAVING A BORE, WITH A TUBULAR PLASTIC INSERT THEREIN

The present invention relates to a composite bearing provided with a metal housing having a bore and a tubular plastic insert fitted into the bore for receiving a shaft used, as an example, in a power operated bi-fold strip curtain door assembly.

Power operated bi-fold strip curtain door assemblies are presently experiencing wide commercial success. The door assemblies are generally used to close open doorways of buildings to keep warm or cool air inside.

To prevent excessive wear upon the plastic strips of the door assembly from vehicles entering and existing, the plastic strips are mounted upon an elongated rigid door section. The rigid door section is hinged at one end to a door frame to permit the door assembly to open and close without damage to the plastic strips.

Power operated bi-fold strip curtain door assemblies generally have used conventional bearings to support and permit the pivoting of the door assemblies. The use of conventional bearings has drawbacks. The main drawback is their continual exposure to inclement weather which reduces the effectiveness of the bearings. The bearings begin to rust and corrode requiring costly maintenance or replacement. A further drawback is the continual need for grease or similar lubricant to ensure the continued effective operation of the bearings. With grease as a lubricant, there is always the possibility grease will be deposited on the strip curtains and on the vehicles or persons who come in contact with the curtains.

A further disadvantage of conventional bearings is their relatively short life span. Since continual maintenance of the bearings is required to ensure continued operation, any reduction in maintenance will shorten the life of the bearings. A still further disadvantage is the necessity for aligning the bearings within very close tolerances. If the bearings are improperly aligned the door will not open properly and the bearings will be damaged.

SUMMARY OF THE INVENTION

The present invention overcomes the above disadvantages inherent in the use of conventional bearings by providing an improved composite bearing having a metal housing provided with a bore having a counterbore at one end thereof. A tubular plastic insert having a flange at one end is tightly located in the bore, with the flange fitting snugly within the counterbore. The tubular plastic insert is designed to receive a shaft.

In this regards an improved shaft and bearing construction is provided for supporting, as an example a bi-fold door assembly. The bearing includes a one piece metal housing having a bore extending from its top surface through its bottom surface, with a counterbore at one end thereof. A tubular plastic insert is press fitted into the bore with the flange provided on the tubular plastic insert located within the counterbore. The plastic bearing insert is held against rotation by the housing and the snug or press fit provided therebetween.

The shaft extends through and is tightly received by the tubular plastic insert to permit relative rotation between the shaft and the housing and the tubular plastic insert. One end of the shaft has a threaded bore which has the same axis as the shaft. The one end of the shaft extends beyond the metal housing and receives a thrust washer and a lock washer, with the thrust washer abutting the flange on the plastic bearing insert. A threaded bolt extends through the thrust and lock washers into the threaded bore of the shaft to prevent vertical separation between the shaft and the bearing and to journal the shaft for relative rotation within the plastic bearing insert.

The improved composite bearing has several advantages. First, the improved composite bearing is immune to rust and corrosion since the housing is constructed from aluminum and the tubular plastic insert which contacts the shaft is made from a polymer material. This extends the life of the composite bearing. Second, due to the plastic bearing insert being made from a polymer material, the bearing has a low coefficient of friction which obviates the need for greasing the bearing. This in turn prevents the possibility of having grease in places where it is not intended and thus reduces maintenance costs. Third, the composite bearing does not have to be aligned within the close tolerances of conventional bearings because the polymer material from which the tubular bearing insert is made is capable of conforming to the element or shaft it supports.

These and other features and advantages of the present invention will become appparent upon reading the following description of which the attached drawings form a part.

DETAILED DESCRIPTION OF THE INVENTION

Figure 1:
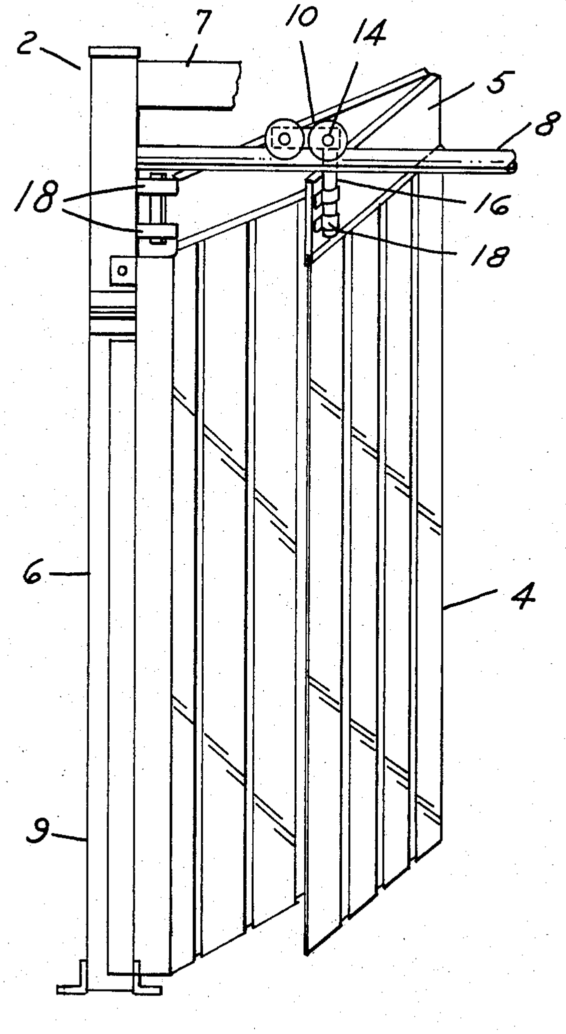
FIG. 1 is a fragmentary-perspective view of a power operated bi-fold strip curtain door assembly in a folded position.
Figure 2:
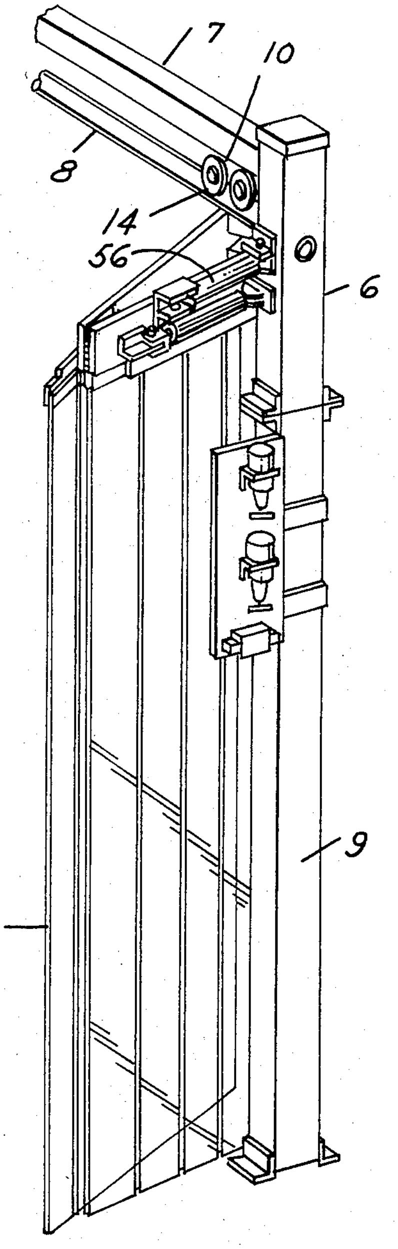
FIG. 2 is another fragmentary-perspective view of the power operated bi-fold strip curtain door assembly of FIG. 1 viewed from the opposite side.

Referring to FIG. 1, a bi-fold strip curtain door assembly is partially illustrated and is designated by reference numeral 2. FIG. 1 only depicts one section of the bi-fold door assembly, the preferred embodiment usually has more than one section. FIG. 2 illustrates the same bi-fold door assembly 2 as depicted in FIG. 1; but, viewed from the opposite side.

FIG. 2 is an illustration taken from U.S. Pat. No. 4,432,406, issued on Feb. 21, 1984 to Belanger et al. The Belanger et al patent describes in great detail the operation of the power operated bi-fold strip curtain door assembly. The disclosure of United States Patent No. 4,432,406 is incorporated herein by reference.

Figure 3:
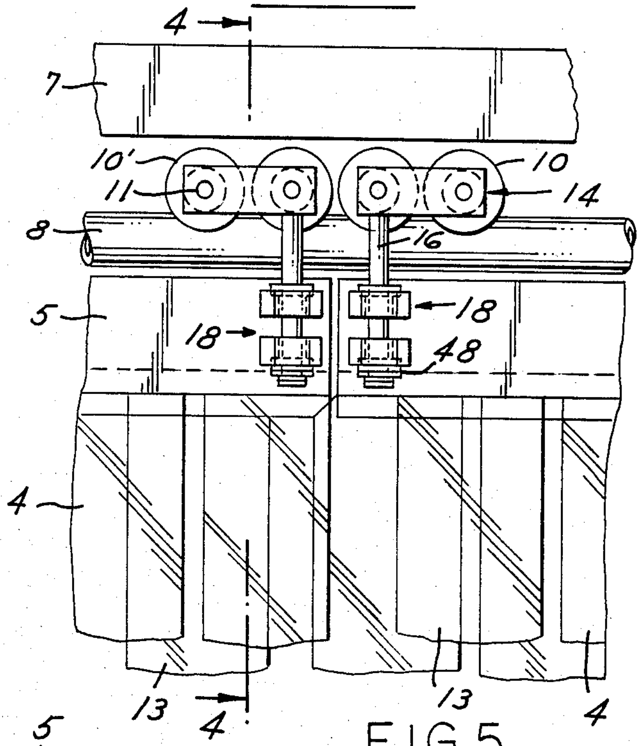
FIG. 3 is an elevational view of the improved composite bearings supporting the bi-fold strip curtain door assembly fragmentarily shown.

Referring to FIG. 1 there is shown one section of a power operated bi-fold strip curtain door assembly 2. As previously stated, the preferred embodiment may have more than one section. The door assembly 2 has a strip curtain 4 suspended from a rigid door section 5. The rigid door section 5 and strip curtain 4 are supported within a frame 6. Each strip curtain 4 includes a plurality of overlapping strip elements 13 as illustrated in FIG. 3.

The frame member 6 is comprised of two vertical supports 9, of which only one is illustrated, and a header member 7 which connects the two vertical supports 9. A track member 8 is attached between the two vertical supports 9. The track member 8 is preferably tubular in shape. The header member 7 and the track member 8 are attached to the vertical supports 9 by conventional means of attachment such as, for example, by welding or by bolting.

Figure 4:
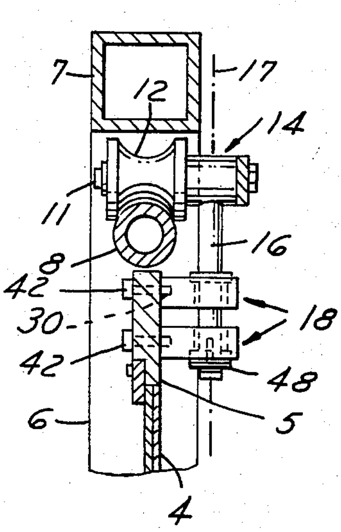
FIG. 4 is a fragmentary side view, in section, taken along line 4—4 of FIG. 3.

A guide roller means 10 is supported on the track member 8. The guide roller means 10 has an annular concave recess 12, as shown in FIG. 4. The annular concave recess 12 aligns the guide roller means 10 upon the track member 8. In the preferred embodiment, two guide rollers 10′ are used on each of the guide roller means 10. Each guide roller 10′ is positioned on an axial shaft 11 which allows the guide roller 10′ to rotate thereon. A carriage means 14 is attached to the guide roller means 10 to keep the two rollers properly aligned upon the track member 8. The guide roller means 10 assists in opening and closing the strip curtain 4.

Extending from the carriage means 14 is an axial shaft 16. In the preferred embodiment as depicted, the axial stub shaft 16 extends vertically downwardly from the carriage means 14 and is attached to the rigid door section 5 of the strip curtain 4. The axial stub shaft 16 has a vertical axis 17.

The attachment of the axial stub shaft 16 to the rigid door section 5 is by means of a composite bearing or bearing member 18. In the preferred embodiment, there are two composite bearings 18 on each of the rigid door sections 5; however, one or more composite bearings 18 could be used. The two composite bearings 18 are vertically aligned and spaced a short distance apart. The axial stub shaft 16 is coaxially received by each of the two bearings 18.

Figure 5:
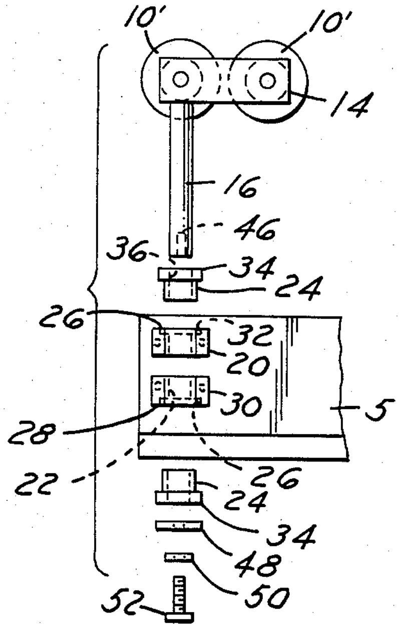
FIG. 5 is an exploded and fragmentary view of a part of FIG. 3, illustrating a pair of composite bearings and the manner in which the shaft is to be mounted in the composite bearings.

Referring now to FIGS. 3, 4 and 5, a pair of composite bearings 18 are secured to the rigid door section 5 in space apart relation. Each bearing 18 comprises a metal housing 20 having a bore 22 in which is tightly located a tubular plastic bearing insert 24. Preferably the metal housing 20 is made from aluminum while the tubular plastic insert 24 may be constructed from any high molecular weight polymers, nylons and high density polyurethane resins having certain characteristics as will be explained hereafter.

Figure 8:
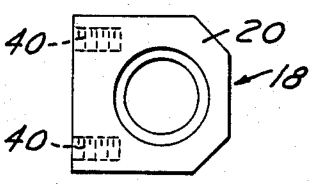
FIG. 8 is a top view of the metal housing of the improved composite bearing looking in the direction of line 8—8 of FIG. 7.

The metal housing 20 has a generally flat first surface or portion 26, a generally flat second surface or portion 28 and a side surface or portion 30 which extends around the periphery of the bearing 18. The housing 20 may be of any configuration such as rectangular or with six sides as shown in FIG. 8. The bore 22 extends from the first surface 26 to the second surface 28, with one of the surfaces having a counterbore 32 therein. The counterbore 32 is designed to receive the flange 34 provided on the plastic bearing insert 24. The tubular plastic insert 24 has an axial bore 36 for the shaft 16. The insert 24 is pressed into the bore 22 of the housing 20 and is held against rotation by the press fit therebetween.

The side surface 30 is provided with a pair of threaded openings 40. Fasteners or bolts 42, FIG. 4, extend through the rigid door section 5 into each metal housing 20 to mount the bearings 18. The threaded openings 40 are parallel to each other and have axes perpendicular to the vertical axis 17.

As shown in FIG. 5, the upper composite bearing 18 has the counterbore 32 of housing 20 facing upwardly while the lower composite bearing 18 has the counterbore 32 facing downwardly. Each counterbore 32 receives the flange 34 of the plastic bearing insert 24 which is tightly received within the bore 22. The tubular bearing inserts 24 are axially aligned and spaced apart and are coaxial with the vertical axis 17 for receiving the axial stub shaft 16. The axial shaft 16 extends through both tubular inserts 24, with the lower end of the shaft 16 extending beyond the surface 26 of the lower composite bearing 18. The lower end of the shaft 18 is provided with an internally threaded bore 46. In assembly a thrust washer 48 and a lock nut or washer 50 are inserted over the exposed end of the shaft 16, with the thrust washer 48 engaging the flange 34 of the adjacent plastic insert 24. A threaded bolt 52 extends through the lock washer 50 and lock washer 48 into the threaded bore 46 of the shaft 16 thereby mounting the shaft 16 on the bearings 18 and preventing vertical separation therebetween. The thrust washer 48 is usually made from brass and aids in retaining the bearing member 18 on the axial stub shaft. The thrust washer 48 and shaft 16 move relative to the bearings 18.

The diameter of the annular bore 36 of the tubular plastic insert 24 is slightly less than the diameter of the axial stub shaft 16. This permits the axial stub shaft 16 to fit tightly within the annular bore 36. The composite bearing members 18 are rotatably slidable about the axial stub shaft 16 as the carriage means 14 travels along the track member 8.

Referring to FIG. 4, the attachment of the composite bearings 18 to the rigid door section 5 is illustrated. In the preferred embodiment there are two bearings 18 on each rigid door section 5. The two composite bearings 18 are positioned upon the axial stub shaft 16 at a predetermined distance from each other along the vertical axis 17. The lower bearing 18 bears against the thrust washer 48. The apertures or openings 40 are aligned with holes formed in the rigid door section 5. Fastening means 42 with external threads are inserted into the holes in the rigid door section 5 and threaded into the internally threaded apertures 40. By tightening the fastening means 42, the bearings 18 are securely fastened to the rigid door section 5 and the rigid door section 5 and strip curtain 4 are supported upon the axial stub shaft 16 by the composite bearings 18.

The composite bearing 18 performs two functions. It supports the load of the rigid door section 5 and the strip curtain 4 and it permits the rigid door section 5 and strip curtain 4 to be opened and closed by allowing the axial stub shaft 16 to journal within the tubular plastic insert 24 of the bearing 18.

In operation, the rigid door section 5 is pulled toward the vertical support 9 by a fluid power cylinder device 56, as shown in FIG. 2. As the rigid door section 5 is pulled toward the frame 9 the carriage means 14 mounted on the guide rollers 10′ is also pulled toward the vertical member 9. Due to the travel of the carriage means 14 longitudinally toward the support 9 the rigid door section 5 is caused to move in an arcuate path. To permit this movement, the rigid door section 5 rotates about the axial stub shaft 16. The bearings 18 permit the necessary rotational movement.

Figure 6:
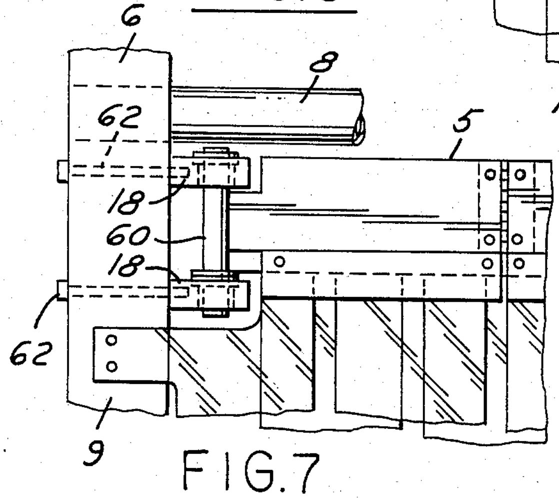
FIG. 6 is an elevational view of a second embodiment of the improved composite bearings supporting the shaft of a bi-fold strip curtain assembly.
Figure 7:
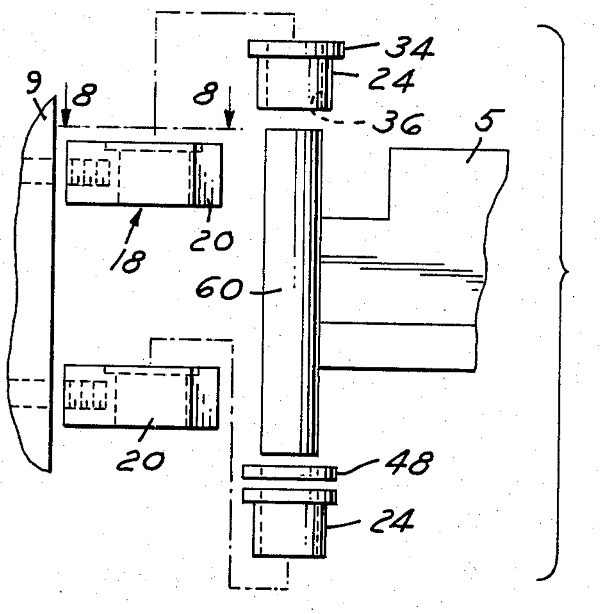
FIG. 7 is an exploded and fragmentary view of a part of FIG. 6, illustrating the manner in which the shaft is adapted to be rotatably journaled in the plastic bearing inserts of composite bearings.

With reference now to FIGS. 6, 7 and 8, another installation utilizing the improved composite bearings 18 will be described. FIG. 6 illustrates the rigid door section 5 connected to the vertical frame 9 by a pair of composite bearings 18. The rigid door section 5 has a vertical pivot pin 60 fixedly attached thereto. The opposite ends of the pivot pin 60 are received in and therefore journaled within the tubular plastic inserts 24 carried by the aluminum housings 20. A pair of threaded openings 40 are provided in the side wall or surface of the metal housing 20 and are adapted to receive a pair of elongated threaded bolts 62 which are inserted through and carried by the frame 9. With such a construction the bearings are mounted in vertical spaced apart alignment along the frame 9.

Rather than using the thrust washer 48, lock nut 50 and threaded bolt 52 as in the embodiment in FIG. 5, the installation of FIGS. 6–8 utilizes a single thrust washer 48 which is positioned over the lower end of the pin 60 and is secured thereto. The thrust washer 48 is therefore mounted to move with the pin 60 and door section 5 upon movement thereof. The thrust washer 48 rotates against the adjacent surface of the flange 34 of the lower bearing insert 24.

In operation, the rigid door section 5 pivots with respect to the vertical support or frame 9 as the power operated bi-fold strip curtain door assembly is opened or closed. The composite bearings 18 permit the pivot pin 60 to freely turn or rotate. Again, the bearing members 18 have the same benefits as previously described.

The bearing members 18, may be constructed from various plastic materials including high or ultra high molecular weight polymers sold under the trademark GAR-DUR by Garland Manufacturing Company of Saco, Maine 04072, nylon and high density polyethylene resins having selected characteristics such as being abrasion resistant, stable in shape, high in lubricity or self-lubricating, tensile strength, rigid, high fatigue, life and creep resistance and unaffected by industrial chemicals and solvents used in the car wash industry. Such plastics include Delrin ®, Oilon ® and Lauramid TM brand cast nylon made in West Germany.

By using a composite bearing including an aluminum housing and a tubular plastic insert it does not have to be aligned as accurately as conventional metal bearings due to the polymer material being capable of conforming to the position of the axial stub shaft. The composite bearing 18 also does not have to be lubricated as does the conventional bearing since the coefficient of friction is much lower with the polymer bearing insert. Such polymer material does not corrode or rust as would be the case in conventional bearings and the polymer material will not seize or cause damage to the axial stub shaft 16 as it is softer than metal and accepts misalignment more readily.

It will be apparent to those skilled in the art that the foregoing disclosure is explanatory in nature rather than limiting, the invention being limited only by the appended claims.

What is claimed is:

1. A door mounting assembly comprising:

a shaft having an upper end connected to a carriage means for supporting a door, said carriage means having at least one guide roller which is adapted to be received on a track, and a lower end having an internally threaded bore which is coaxial with said shaft;

a first metal housing having a top surface, a bottom surface, and at least one flat side surface, a first annular bore in said first metal housing extending from said top surface through said bottom surface, one end of said first bore opening into said top surface being provided with a first counterbore, a first tubular plastic bearing insert having a flange at one end thereof, said insert being tightly received in said first bore, with said flange in said first counterbore, said tubular plastic bearing insert receiving said shaft;

a second metal housing spaced from said first metal housing and having a top surface, a bottom surface, and at least one flat side surface;

a second annular bore in said second metal housing coaxial with said first bore and extending from said top surface through said bottom surface, one end of said second bore opening into said bottom surface and being provided with a second counterbore, a second tubular plastic bearing insert having a flange at one end thereof, said insert being tightly received in said second bore, with said flange in said second counterbore, said tubular plastic bearing insert receiving said shaft;

said lower end of said shaft extending below said second metal housing, a thrust washer and a lock washer on said lower end of said shaft, with said thrust washer abutting the flange on said second plastic bearing insert, and a threaded bolt extending through said washers into the threaded bore of said shaft.

2. The door mounting assembly of claim 1 wherein said housings are made from aluminum.

3. The door mounting assembly of claim 1 wherein said flat side surfaces each have a pair of threaded openings having parallel axes which are perpendicular to the first and second annular bores.

4. A pivot pin and bearing construction for supporting a door comprising:

a vertical pivot pin attached to the door;

a first metal housing having a top surface, a bottom surface and at least one flat side surface, a first annular bore in said first metal housing extending from said top surface through said bottom surface, a top end of said bore opening into said top surface and being provided with a counterbore, a first tubular plastic bearing insert having a flange on one end, said first insert being tightly received by and located in said first bore with said flange in said counterbore, a second metal housing spaced from said first housing and having a top surface, a bottom surface and at least one flat side surface, a second annular bore in said second metal housing extending from said top surface through said bottom surface, a top end of said second annular bore opening into said top surface being provided with a counterbore, a second tubular plastic bearing insert having a flange on one end, said second insert being tightly received by and located in said second bore, with said flange in the counterbore of said second bore, a thrust washer disposed adjacent the upper end of the flange of the second insert;

said pivot pin extending between and being pivotably received by said first and second tubular plastic inserts to permit relative rotation between said pivot pin and said first and second tubular plastic inserts, said pivot pin having a horizontally extending door section attached thereto between the first and second inserts which bears upon said thrust washer as said pivot pin is pivoted.

5. The pivot pin and bearing construction defined in claim 4 wherein said housings are made from aluminum.

6. The pivot pin and bearing construction defined in claim 4 wherein said flat side surfaces each have a pair of threaded openings having parallel axes which are perpendicular to the first and second annular bores for receipt of fastening means.

7. An improved bearing means for supporting a bi-fold door member positioned within a frame member having, carriage means supported on a track member for longitudinal movement thereon, an axial stub shaft extending from said carriage means receivable by said bearing means to support said bi-fold door member, said bearing means comprising:

a metal housing having a top surface, a bottom surface, and at least one side surface, an annular bore extending from said top surface through said bottom surface, one end of said bore being provided with a counterbore, a tubular plastic bearing insert having a flange on one end fitted into said bore for tightly receiving said axial stub shaft, said bearing means being rotatably slidable about said axial stub shaft as said carriage means travels along said track, attaching means on said one side surface for connecting said bearing means to said bi-fold door member, whereby said bi-fold door member is supported by said bearing means and said bearing means is slidably rotatable about said axial stub shaft, one end of said axial stub shaft having a threaded bore having the same axis as said shaft, said one end extending beyond said metal housing, a thrust washer and a locker washer on said one end of said shaft, with said thrust washer abutting the flange on said plastic bearing insert, and a threaded bolt extending through said washers into the threaded bore on said shaft to mount the shaft upon said metal housing for rotation within said plastic bearing insert.

8. The improved bearing means of claim 7, wherein said attaching means is comprised of threaded apertures formed in said one side surface for receipt of fastening means.

9. The improved bearing means of claim 7, wherein said attaching means is comprised of a pair of threaded apertures having axes which are parallel and generally perpendicular to the axis of said annular bore.

10. The improved bearing means of claim 7, wherein said tubular plastic bearing insert is made from an ultra high or high molecular weight polymer which is self-lubricating.

11. An improved bearing means for supporting a door member having a pivot means connected thereon positioned within a frame member, said bearing means comprising:

first and second spaced metal housings each having a top surface, a bottom surface, and at least one side surface;

first and second annular bores formed respectively in said first and second housings and extending from said top surfaces to said bottom surfaces, one end of each bore being provided with a counterbore, first and second tubular plastic bearing inserts each having a flange on one end fitted into said bores for tightly receiving said pivot means, said pivot means being rotatably journaled within said tubular plastic bearing inserts as said door member is opened or closed, attaching means on said side surfaces for connecting said housings to said frame member, and whereby said door member is pivotally supported by and between said housings and bearing inserts.

12. The improved bearing means of claim 11, wherein said attaching means is comprised of threaded apertures formed in said one side surfaces for receipt of fastening means.

13. The improved bearing means of claim 11, wherein said attaching means is comprised of a pair of threaded apertures in each of said one side surfaces, said apertures having axes which are parallel and generally perpendicular to the axes of said annular bores.

14. The improved bearing means of claim 11, wherein the material for said plastic bearing insert is taken from the group including an ultra high molecular weight polymer, a high molecular weight polymer, nylon and high density polyethylene resins.

* * * * *